(12) United States Patent
Cmielowski et al.

(10) Patent No.: US 10,542,176 B2
(45) Date of Patent: Jan. 21, 2020

(54) ENHANCING GRAPH VISUALIZATION WITH SUPPLEMENTAL DATA

(71) Applicant: International Business Machines Corporation, Armonk, NY (US)

(72) Inventors: Lukasz G. Cmielowski, Cracow (PL); Tymoteusz Gedliczka, Cracow (PL); Kamil Smoron, Krzeszowice (PL); Andrzej J. Wrobel, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/251,270

(22) Filed: Jan. 18, 2019

(65) Prior Publication Data

US 2019/0158697 A1 May 23, 2019

Related U.S. Application Data

(63) Continuation of application No. 15/284,880, filed on Oct. 4, 2016, now Pat. No. 10,250,776.

(51) Int. Cl.
*G06K 9/00* (2006.01)
*H04N 1/32* (2006.01)
*G06T 11/20* (2006.01)

(52) U.S. Cl.
CPC ....... *H04N 1/32229* (2013.01); *G06T 11/206* (2013.01)

(58) Field of Classification Search
CPC . G06T 11/206; G06T 1/0021; H04N 1/32229; G06F 17/30017; G06F 17/30513;
(Continued)

(56) References Cited

U.S. PATENT DOCUMENTS 6,697,802 B2 * 2/2004 Ma .................. G06F 16/284
7,617,185 B2 * 11/2009 Werner .............. G06F 16/9038
(Continued)

OTHER PUBLICATIONS

Symons et al., MGV: A Generic Graph Viewer for Comparative Omics Data, vol. 27, No. 16, 2011, Retrieved from Internet: URL: http://bioinformatics.oxfordjournals.org/content/27/16/2248.full, pp. 2248-2255.
(Continued)

*Primary Examiner* — Avinash Yentrapati
(74) *Attorney, Agent, or Firm* — Schmeiser, Olsen & Watts, LLP; Mark Vallone

(57) ABSTRACT

A method and system for communicating supplemental data for nodes of a graph. A visual representation of the graph is divided into portions of a computer screen. Each portion is a rectangle corresponding to a respective node of the graph. Dividing the visual representation of the graph into portions includes determining a number of pixels in rectangles displayed on the computer screen along with the graph. Supplemental data for each respective node, together with an offset distance between a reference point of each respective node and a reference point of the supplemental data for each respective node, is encoded steganographically. Fixed length attributes related to the respective node are prioritized. The attributes are encoded steganographically into the rectangle corresponding to the respective node, starting with a highest priority attribute of the fixed length attributes and continuing sequentially according to a priority of the remaining attributes of the fixed length attributes.

20 Claims, 7 Drawing Sheets

(58) Field of Classification Search
CPC ......... G06F 17/30554; G06F 17/30595; G06F 17/30716; G06F 17/30941; G06F 17/30958; G06F 17/30961; G06F 17/30991; G06F 17/30994; G06F 17/509

See application file for complete search history.

(56) References Cited

U.S. PATENT DOCUMENTS

| | | | | |
|---|---|---|---|---|
| 8,791,948 | B2* | 7/2014 | Patil | G06T 11/206 345/440 |
| 9,461,876 | B2* | 10/2016 | Van Dusen | H04L 41/04 |
| 9,836,183 | B1* | 12/2017 | Love | G06T 11/206 |
| 2002/0001395 | A1* | 1/2002 | Davis | G06F 21/10 382/100 |
| 2004/0030741 | A1* | 2/2004 | Wolton | G06F 16/954 709/202 |
| 2005/0108217 | A1* | 5/2005 | Werner | G06F 16/9038 |
| 2007/0055689 | A1* | 3/2007 | Rhoads | G06K 7/1417 |
| 2007/0299862 | A1* | 12/2007 | Aggarwal | G06F 16/40 |
| 2011/0289207 | A1* | 11/2011 | Liu | H04L 41/12 709/224 |
| 2012/0054226 | A1* | 3/2012 | Cao | G06F 16/34 707/769 |
| 2012/0198319 | A1* | 8/2012 | Agnoli | G06F 9/4843 715/202 |
| 2012/0278261 | A1* | 11/2012 | Lin | G06N 5/003 706/12 |
| 2014/0078151 | A1* | 3/2014 | Garr | G06T 11/206 345/440.2 |
| 2014/0125673 | A1* | 5/2014 | Ankisettipalli | G06T 11/206 345/440 |
| 2015/0033106 | A1* | 1/2015 | Stetson | G06F 16/24566 715/215 |
| 2016/0239545 | A1* | 8/2016 | Stetson | G06F 16/24566 |
| 2017/0154088 | A1* | 6/2017 | Sherman | G06F 9/45558 |
| 2017/0316059 | A1* | 11/2017 | Stetson | G06F 16/24566 |
| 2018/0097966 | A1 | 4/2018 | Cmielowski et al. | |

OTHER PUBLICATIONS

Madelaine D. Boyd, Inprov: Visualizing Provenance Graphs With Radial Layouts and Time-Based Hierarchical Grouping, Mar. 30, 2012, Retrieved from Internet: URL: https://www.seas.harvard.edu/sites/default/files/files/archived/Boyd.pdf, 59 pages.

Stitz, et al., Avocado: Visualization of Workflow-Derived Data Provenance for Reproducible Biomedical Research, Mar. 18, 2016, Retrieved from: URL: http://biorxiv.org/content/biorxiv/early/2016/03/18/044164.full.pdf, 24 pages.

Office Action (dated Jun. 15, 2018) for U.S. Appl. No. 15/284,880, filed Oct. 4, 2016.

Amendment (dated Sep. 7, 2018) for U.S. Appl. No. 15/284,880, filed Oct. 4, 2016.

Notice of Allowance (dated Nov. 19, 2018) for U.S. Appl. No. 15/284,880, filed Oct. 4, 2016.

* cited by examiner

ENHANCING GRAPH VISUALIZATION WITH SUPPLEMENTAL DATA

This application is a continuation application claiming priority to Ser. No. 15/284,880, filed Oct. 4, 2016, now U.S. Pat. No. 10,250,776, issued Apr. 2, 2019.

TECHNICAL FIELD

The present invention relates generally to a method and system for communicating supplemental data for portions of an image, and more specifically, to a method for communicating supplemental data for a node for a system graph representing a system.

BACKGROUND

A visualization of complex relationships of entities helps to understand any complex system than any textual explanations, scripts or tables. Complex relationships are often visually expressed as system graphs comprising nodes. For software programs, which visualize any kind of graphs, the screen real estate or screen size is a very limited resource. The more nodes the graph comprises, the more difficult it is to display additional information relating to a node in a readable form. In such contexts, it is a challenge to display the node attributes of the graph without further negatively impacting readability. Examples of graph visualization components, having the capability of displaying a topology graph of a software application or a group of configuration items (CIs) with related inter-dependencies, are well known in the industry. However, if the displayed topology of the complex system is not matching user expectations, the user may send a screenshot of such displayed topology to a support team. Such a screenshot may show a name related to each node icon, but in most cases does not show sufficient additional information and more comprehensive data about specific nodes to enable performance of a proper analysis of the missed user expectations. It would be helpful for support engineers to know additional attributes of each CI such as GUID (Globally Unique Identifier) identifier, type of CI, last modification time, etc. Currently, it is not possible to access additional information about a node as part of the screenshot because of the negative impact to the readability of the graphical representation of the overall graph.

SUMMARY

Embodiments of the present invention provide a method, and associated computer system and computer program product, for communicating supplemental data for nodes of a graph representing a system. One or more processors of a computer system divide a visual representation of the graph into a plurality of portions, each portion of the visual representation of the graph being a rectangle corresponding to a respective node of the graph, said visual representation being an area of a computer screen displaying the graph. The one or more processors steganographically encode supplemental data for each respective node, together with an offset distance between a reference point of each respective node and a reference point of the supplemental data for each respective node, into the portion of the graphical representation corresponding to each respective node.

BRIEF DESCRIPTION OF THE DRAWINGS

Embodiments of the invention will be described, by way of example only, and with reference to the following drawings.

DETAILED DESCRIPTION

Figure 1:
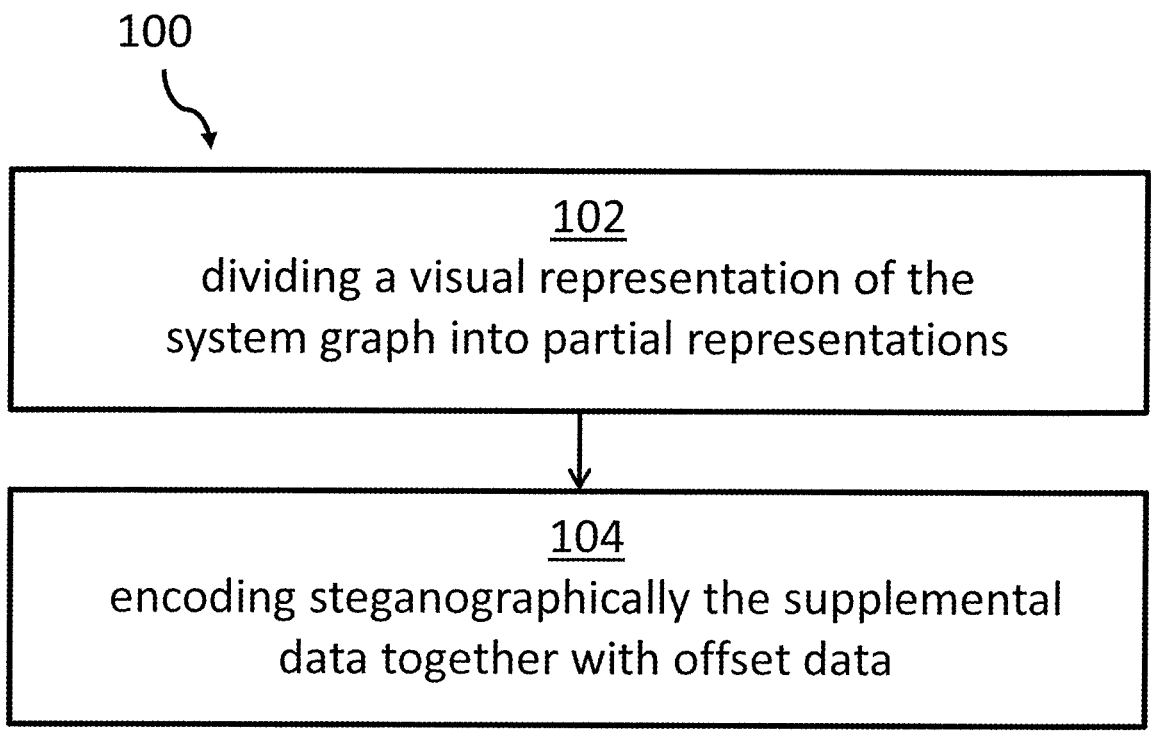
FIG. 1 shows a block diagram of an embodiment of the inventive method for communicating supplemental data for a node for a system graph representing a system.

In the context of this description, the following conventions, terms and/or expressions may be used.

The term 'system graph' (hereinafter, 'graph') may denote a graph or graphical representation of a more or less complex system. In mathematics and computer science, graph theory is the study of graphs, which are mathematical structures used to model pairwise relations between objects. A graph in this context is made up of vertices, nodes, or points which are connected by edges, arcs, or lines. A graph may be undirected, meaning that there is no distinction between the two vertices associated with each edge, or the graph's edges may be directed from one vertex to another. Consequently, the term 'a node' may denote an element or an object of a graph. The totality of nodes and the interconnections (e.g., edges) among the nodes may define the system graph.

It may also be noted that in another embodiment not all elements or nodes of the graph need to be connected. There may be independent parts of the graph, representing non-connected nodes or any other representative graphic elements. There may also be two or more graphs displayed with no connection between the graphs. In an embodiment, the term 'graph' or 'system graph' may be a synonym for any more or less structured images in which the nodes of the system graph may be any graphical icons. In such an embodiment, no connection may be required between the individual nodes or their equivalents.

The term 'supplemental data' may denote additional information relating to one of the nodes in the form of textual information, attributes, behavioral data, functional data or metadata, and so on. The amount of supplemental data may be too large to always visualize (i.e., display) the supplemental data together with the nodes of the graph.

The term 'partial representations' may denote that not always the complete visual representation of the system graph may be referenced but only portions of the visual representation of the system graph may be referenced. Thus, the graphical representation of the complete system graph may be the composite of all partial representations. A partial representation may have a one-to-one real relationship to a specific node of the system graph.

The graphical representation of the system graph encompasses an area of a display screen (e.g., of a computer), also called "computer screen", in which the graphical representation is displayed. Thus, each partial representation (of the graphical representation of the system graph) is a portion of the graphical representation that includes a respective node of the system graph. Therefore, each partial representation encompasses a portion of the area of the display screen in which the portion of the graphical representation is displayed.

The term 'steganographically' may denote a way to encode data into a graphical representation using steganography. Steganography is defined as the practice of concealing a file, message, image, or video within another file, message, image, or video. The word steganography combines the Greek words steganos, meaning "covered, concealed, or protected", and graph meaning "writing". Steganography may be differentiated from encryption. Whereas cryptography is the practice of protecting the content of a message alone, steganography is concerned with concealing the fact that a secret or invisible message is being transmitted, as well as concealing the content of the message.

In digital steganography, electronic communications may include steganographic coding inside of a transport layer, such as a document file, image file, program or protocol. Media files may be ideal for steganographic transmission because of the large size of media files. For example, a sender might start with an innocuous image file and adjust the color of every i-th pixel (e.g., every $20^{th}$ or $50^{th}$ or 100th pixel) to correspond to a letter in the alphabet, a change so subtle that someone not specifically looking for the change is unlikely to notice the change. The change may not be recognizable in a typical pixel-based image. Other steganographic coding may be using the last bit of the last two bits of a pixel for the supplemental data. Using this method, the visual representation may only be impacted slightly depending on the pixel depth of an image.

It may be noted that supplemental data may also be encoded steganographically for the connections between the nodes if appropriate, in which case, the number of nodes and the number of connections between the nodes may be used to determine the required number of rectangles. However, supplemental data may only be added for a subset of the connections between nodes in a subset of nodes.

It may also be noted that a node in a system graph may be anything from a computing node of a complex information technology network to a semiconductor chip sub-component, or from an entity relationship model to elements of a complex supply chain. Thus, the concept of the present invention may be applied to a large variety of different scenarios.

The method of the present invention for communicating supplemental data for a node for a system graph representing a system may offer multiple advantages and technical effects.

Using the inventive concept may allow almost invisible integration of additional attribute data into a graphical representation of a system graph, which may allow transporting additional information for nodes of the system graph as part of the graphical representation. No additional data layers and/or links between the graphical representation of the system graph and supplemental data are required. Additionally, complex data structures for supplemental data in separate information containers, including complicated referencing between a graphical representation of a node and the additional independently managed supplemental data, are not required. The graphical representation includes the supplemental data without negatively impacting the visual impression of the graphical representation of the system graph.

Furthermore, the amount of supplemental data is not negatively impacted by zooming. Additionally, if only a fraction of the graphical representation of a complete system graph is captured by a screenshot, the supplemental data of a node are still part of the graphical representation of the portion of the system graph. No complex linking of the fraction of the system graph and additional supplemental data in different data containers are required.

Moreover, the graphs may also be exported into other graphic formats such as a vector graphic format such as SVG (Scalable Vector Graphics) without losing the supplemental data as part of the image.

In the following, further embodiments of the method for supplemental data for a node for a system graph representing a system are described. These further embodiments may also be applicable to a related extraction method, as well as to related systems.

According to an embodiment of the method, the dividing of a visual representation of the system graph into partial representations may comprise determining a number of pixels of rectangles, based on a number of pixels of the system graph representation and a number of the nodes of the system graph such that the partial representations and the rectangles correspond to each other. In one embodiment, the sides of the rectangles may have an equal side length; thus, the rectangles may be squares. In one embodiment, the number of nodes and the number of squares may be identical. In another embodiment, the number of rectangles may only relate to a subset of the nodes. Thus in one embodiment, the number of nodes may be larger than the number of squares. As a consequence, supplemental data may be available only for a subset of nodes.

According to an embodiment of the method, the method may also comprise via a determining unit determining a maximum number of available bits per node; in particular, per rectangle, for the supplemental data for the node based on an applied steganographical method for the steganographical encoding and the number of pixels per rectangle. Different steganographical technologies are known. The last one or two least significant bits of each pixel may be used, or, e.g., every $i^{th}$ pixel (e.g., every $30^{th}$ pixel, every $50^{th}$ pixel, every $70^{th}$ pixel, etc.) may be used for the additional, supplemental data. Thus, the maximum amount of bits or bytes for supplemental data for a node may be calculated without using many computing resources.

According to one embodiment of the method, the reference point of the node may be a top left corner position of the node or a center position of the node, in particular of the related icon of the node. In an embodiment, the reference point of the supplemental data may be a top left position corner of the rectangle corresponding to a node or a center position of the rectangle corresponding to the node. Thus, exact reference positions may be used for a clearly defined relationship between a graphical representation of a node and a related rectangle comprising the supplemental data.

A further embodiment of the method may comprise integrating a predefined start pattern at the beginning of each supplemental data of each rectangle. Such a predefined start pattern in, e.g., a top left corner of the rectangle may be useful for a decoding of the steganographically encoded supplemental data for a node.

An additional embodiment of the method may comprise prioritizing fixed length attributes related to the node and steganographically encoding the attributes into the rectangle relating to the node starting with a highest priority attribute sequentially according to the priority of the fixed length attributes. Thus, it may be ensured that the most relevant attributes describing the node are steganographically encoded into the supplemental data for the node. If the bits in the rectangle are not sufficient for all available supplemental data, it may be ensured that the most relevant supplemental data are steganographically encoded in the rectangle.

Additionally, it may be helpful to use fixed length attributes because fixed length attributes may be decoded more easily. Otherwise it may be required to include, at the beginning of the steganographically encoded supplemental data, a record structure of the supplemental data including a length of individual attributes. Thus, using fixed length attributes may simplify a decoding process.

According to one embodiment of the method, the method may also comprise selecting positions of the partial representations in respect to related nodes of the selected positions such that a sum of all of the offsets may be reduced or even minimized. This may be achieved by minimizing a first summation, over the nodes, of |delta−x|*|delta−y| in which delta−x may be the difference between an x-coordinate of a graphical representation of a node and a related rectangle. In the same way, delta−y may be the difference between a y-coordinate of the same graphical representation of the same node and the related rectangle.

Alternatively, a second summation, over the nodes, of |delta−x|+|delta−y|, in which delta−x may be the difference between an x-coordinate of a graphical representation of a node and a related rectangle, may be minimized. Both the first and second summations may ensure that nodes and related rectangles comprising the node specific supplemental data may be rendered relatively close to each other on a screen. However, other algorithms may be used to reach the goal of minimizing the first or second summation. The actual selected algorithm may be chosen dependent on typical characteristics of the displayed image/system graph.

Alternatively, the rectangles may be selected to not overlap and a total sum of the area of all rectangles may be maximized in order to encode as much attribute values as possible.

According to an embodiment of the method, size information about the partial representation may be integrated steganographically into the supplemental data. A reliable manner may be in expressing the size of the rectangle in pixels in an x- and a y-direction, which may be useful for a lean decoding algorithm because no additional determination about the size of the rectangle comprising the encoded supplemental data has to be made. Alternatively, an end of the supplemental data mark may be included into the supplemental data at the very end of the supplemental data, which may correspond to a lower right corner of the rectangle. Additionally, there may be pixel flags at the end of each pixel line of a rectangle, indicating that the rectangle comprising the supplemental data continues also to the next pixel line.

In the following, a detailed description of the figures will be given. All instructions in the figures are schematic. Firstly, a block diagram of an embodiment of the inventive method for communicating supplemental data for a node for a system graph representing a system is given. Afterwards, further embodiments as well as embodiments of the system for communicating supplemental data for a node for a system graph will be described.

FIG. 1 shows a block diagram of an embodiment of the method 100 for communicating supplemental data for nodes of a system graph representing a system. The system graph can represent a wide variety of different system types, as mentioned above. The method comprises dividing, in step 102, a visual representation of the system graph into partial representations (i.e., portions), each partial representation being associated with a respective node of the system graph. Each partial representation may comprise the respective node.

The method comprises steganographically encoding, in step 104, the supplemental data together with offset data (i.e., offset distance data) between a reference point of the node and a reference point of the supplemental data for the node, into the associated partial representation. Typically, this encoding is done for as many nodes as are available within the system graph. However, the method may also be applied to only a subset of the nodes. In such a case, more supplemental data per node may be encoded steganographically. A top left corner of a node, a center pixel of the node or the like may be chosen as the reference point of the node as long as the reference point is consistently used. The term "offset" means "distance" or "offset distance".

Figure 2:
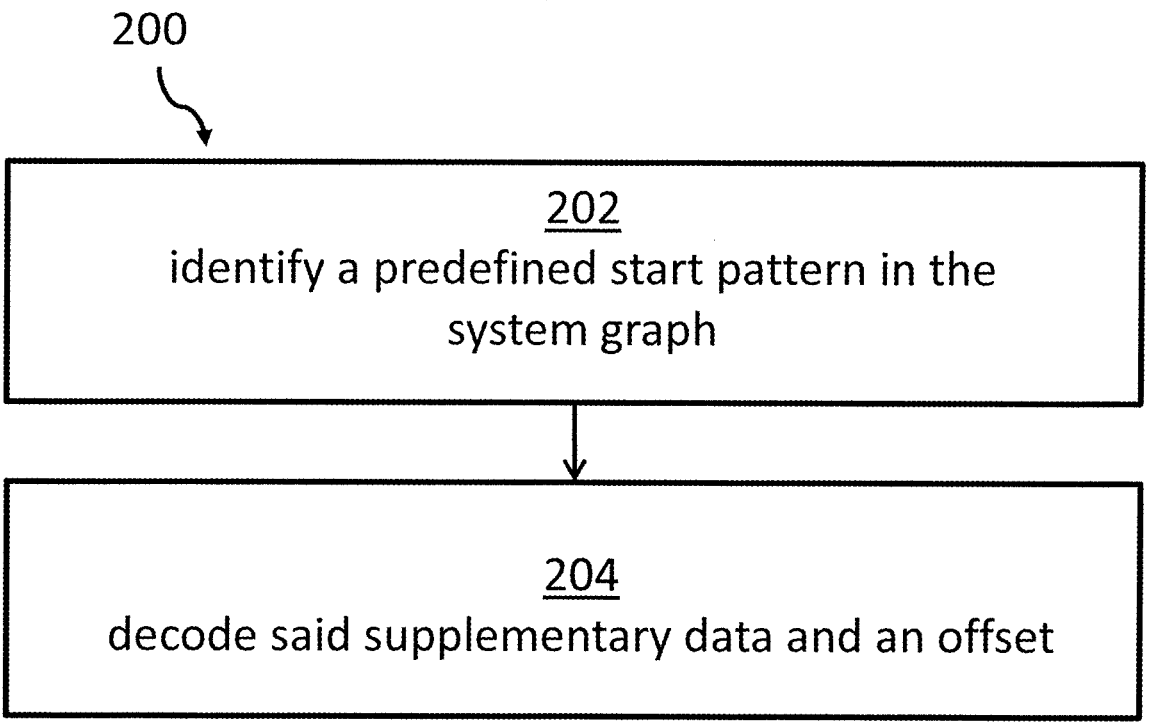
FIG. 2 shows a method for extracting communicated supplemental data for a node of a system graph representing a system, in accordance with embodiments of the present invention.

FIG. 2 shows a method 200 for extracting communicated supplemental data for a node of a system graph representing a system, in accordance with embodiments of the present invention. The method 200 may be a reverse method if compared to the method 100 described in the context of FIG. 1. The method 200 comprises identifying, in step 202, a predefined start pattern in the system graph, in particular in the system graph representation, representing the system for determining a rectangle comprising encoded supplemental data associated with a node in the system graph representation. The supplemental data are encoded steganographically. The method 200 comprises decoding, in step 204, the supplemental data and an offset (i.e., distance or offset distance) between a reference point of the supplemental data and a reference point of the related node.

Figure 3:
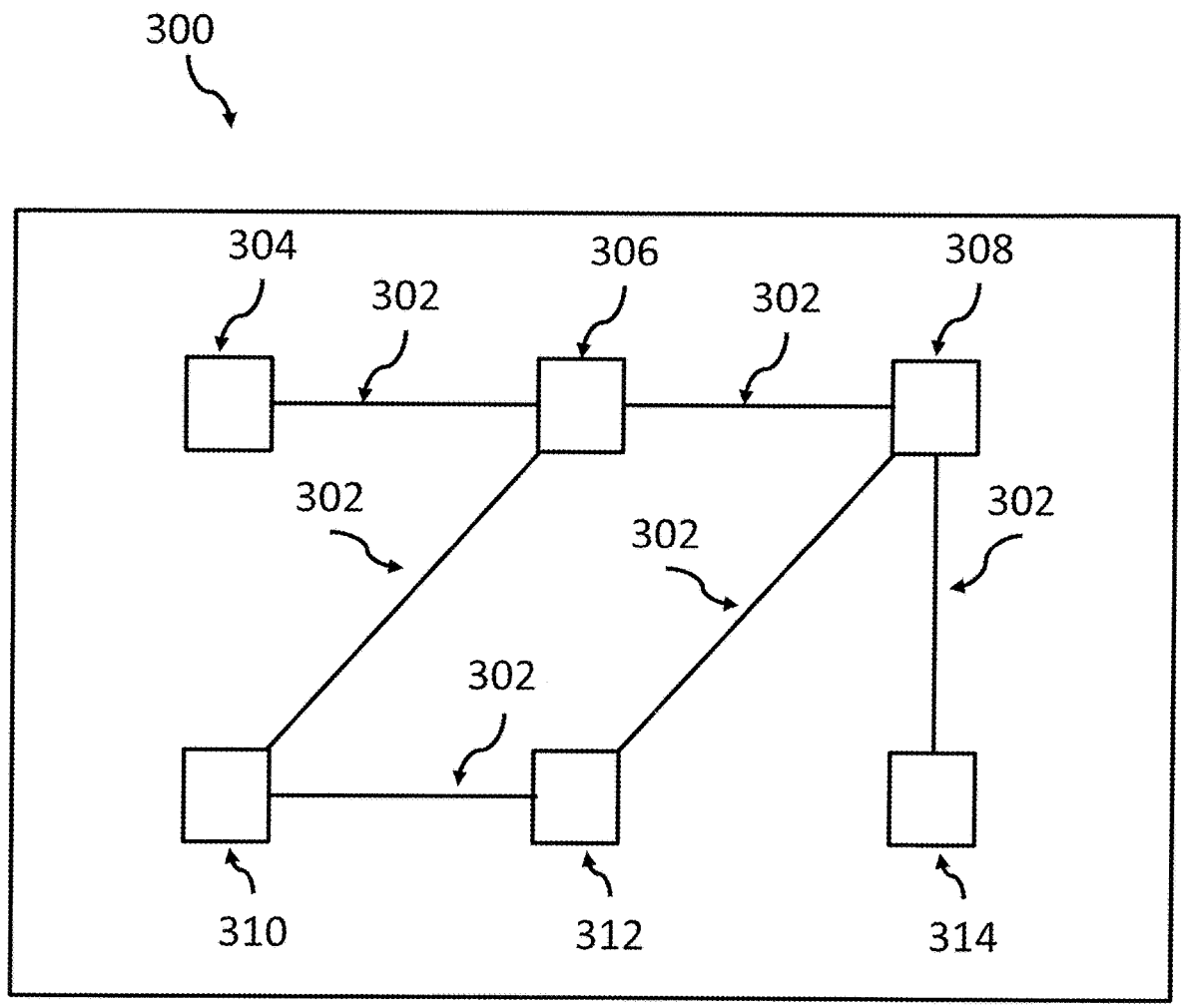
FIG. 3 shows a block diagram of an embodiment of a graphical representation of a system graph on a screen, in accordance with embodiments of the present invention.

FIG. 3 shows a block diagram of an embodiment 300 of a graphical representation of a system graph in a screen, in accordance with embodiments of the present invention. The screen is a display screen of a computer. In the system graph, nodes 304, 306, 308, 310, 312, 314 are linked with relationship, connection or dependency lines or edges 302 between individual nodes. Realistic system graphs may be much more complex with many more nodes and relationships between different nodes. However, it may already be recognizable that it may be difficult to display additionally a comprehensive amount of data for each node if the frame around the displayed nodes represents an outer frame of a computer screen. There is not enough room on the computer screen to display a large amount of attributes or supplemental data in addition to the node and dependencies itself.

It may be noted that a corner of the screen may be used as overall reference point and origin of a coordinate system. However, other reference points are possible.

Figure 4:
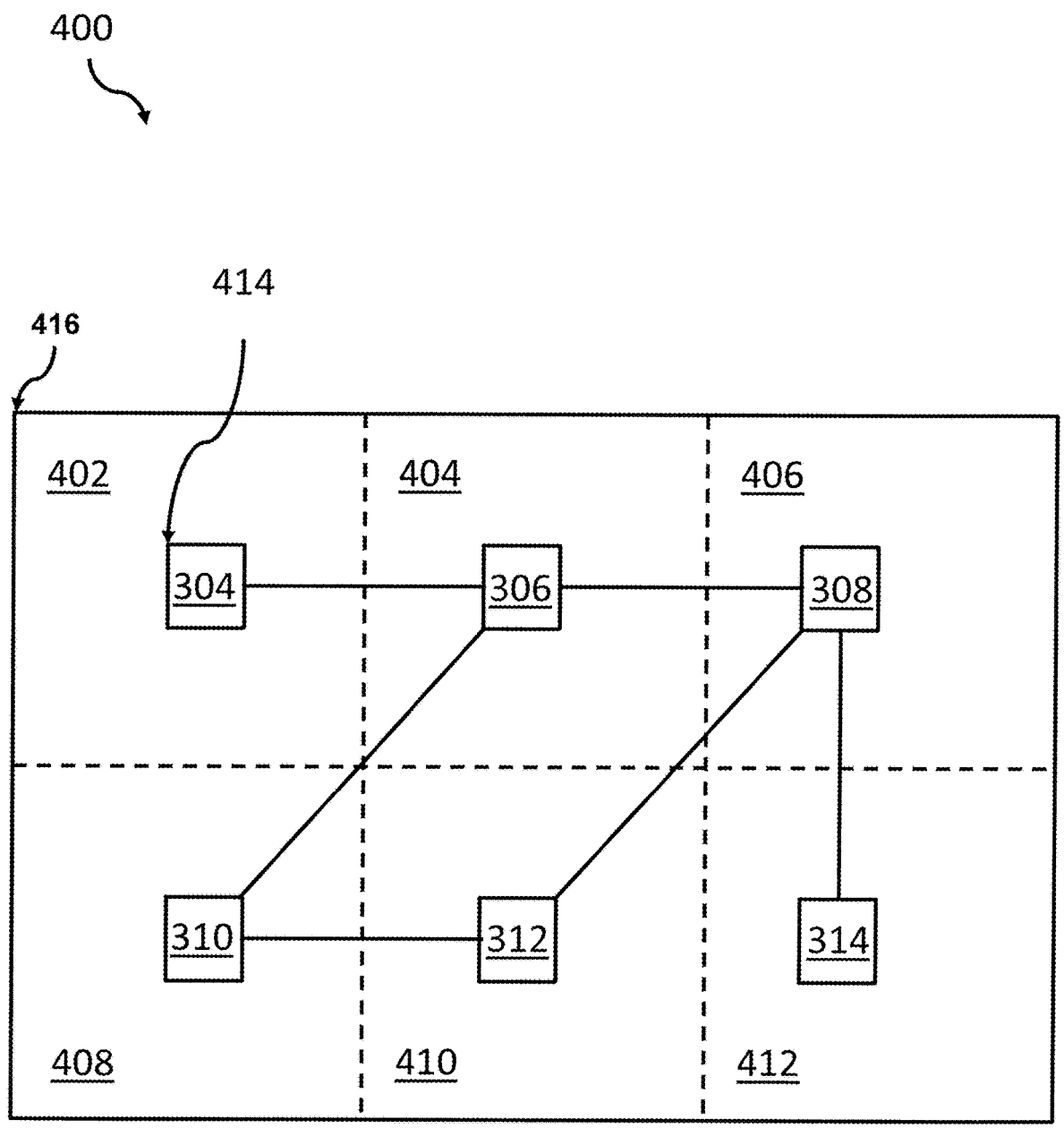
FIG. 4 shows a block diagram of the embodiment of a graphical representation of the system graph of FIG. 3 with related rectangles, in accordance with embodiments of the present invention.

FIG. 4 shows a block diagram 400 of the embodiment of a graphical representation of a system graph of FIG. 3 with related rectangles, in accordance with embodiments of the present invention. Thus, additionally, rectangles 402, 404, 406, 408, 410, 412 are shown as including dashed lines. Each of the nodes 304, 306, 308, 310, 312, 314 is rendered within one of the rectangles 402, 404, 406, 408, 410, 412. A 1:1 relationship may be built between a node and a rectangle. Such pairs may, e.g., be node 304 with rectangle 402 or, node 312 with rectangle 410. However the node may not be placed as regular, as shown in FIG. 4.

As a reference point for the node 304 representation, the top left corner 414 may be used. For the rectangle 402 which is a partial representation of the system graph, the related top left position 416 may be used as a reference point. The offset is the distance between the top left corner 414 for the node 304 and the reference point 416 of the supplemental data for the node 304.

Figure 5:
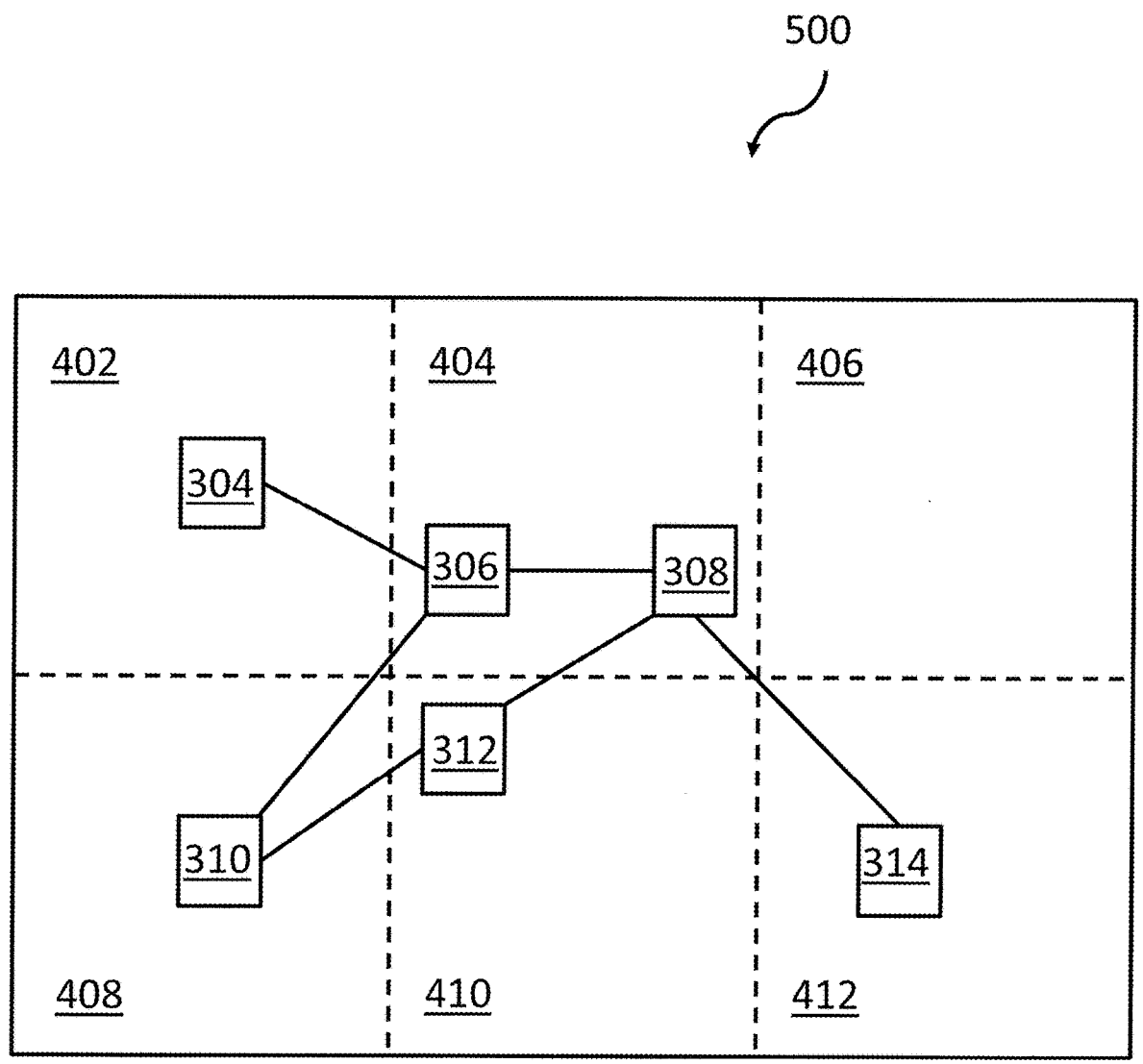
FIG. 5 shows another block diagram of the embodiment of a graphical representation of the system graph of FIG. 3, in accordance with embodiments of the present invention.

FIG. 5 shows another block diagram 500 of the embodiment of a graphical representation of the system graph of FIG. 3, in accordance with embodiments of the present invention. In FIG. 5, the nodes 304, 306, 308, 310, 312, 314 of the graph are not positioned in the same way as in FIG. 3. The representation and distribution of the nodes 304, 306, 308, 310, 312, 314 may be a bit more realistic, but are not well distributed across the screen. However, the same relationships as in FIG. 4 may be built into the block diagram 500. For example, node 304 may be paired with rectangle 402 and node 312 may be paired with rectangle 410. It may not be required that the graphical representation of a node lies within a related rectangle. In one embodiment, the relationship may also be built if a node lies outside the related rectangle.

Figure 6:
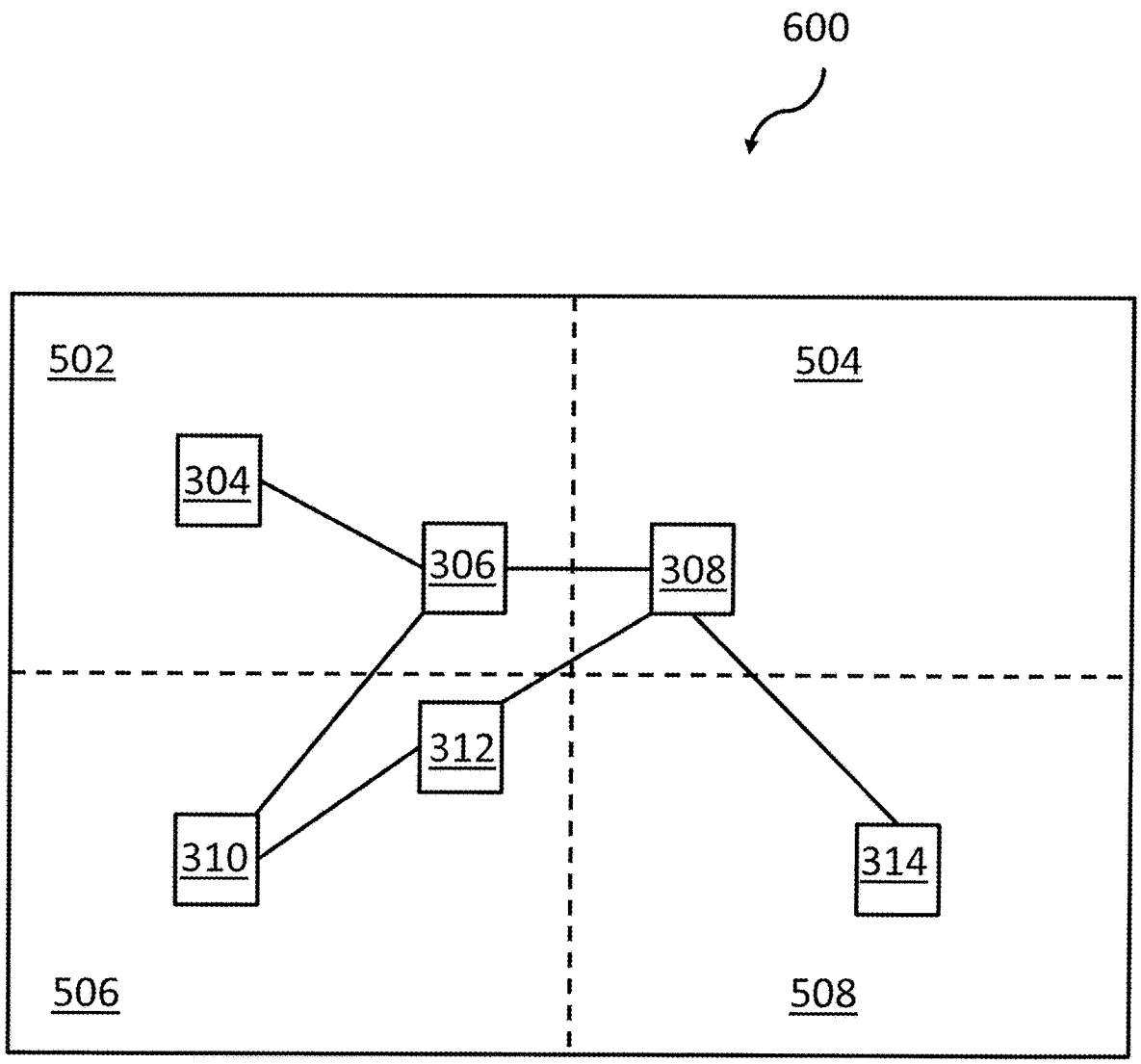
FIG. 6 shows another block diagram of the embodiment of a graphical representation of the system graph of FIG. 3, in accordance with embodiments of the present invention.

FIG. 6 shows another block diagram 600 of the embodiment of a graphical representation of a system graph of FIG. 3, in accordance with embodiments of the present invention. In FIG. 6, the distribution of nodes of FIG. 5 is used again, but in this example, it may be assumed that only a subset of the nodes may qualify for supplemental data. It may be assumed that supplemental data may only be required for nodes 306, 308, 312, 314. For certain reasons, no supplemental data may be required for nodes 304 and 310. Hence, only four rectangles 502, 504, 506, 508 may be required for an encoding of supplemental data for the four relevant nodes 306, 308, 312, 314. As a consequence, more supplemental data may be encoded within one of the rectangles 502, 504, 506, 508 per node.

However, the pair of nodes and rectangles may still be built as in FIG. 6. Thus, also here, a 1:1 relationship may be built between a node and a rectangle. Such pairs may be, for example, node 306 with rectangle 502 and node 312 with rectangle 506. It may be noted that it may not be required that a node lies within the screen area of a related rectangle. For practical reasons, however, a node may lie within the screen area of a related rectangle in one embodiment.

Figure 7:
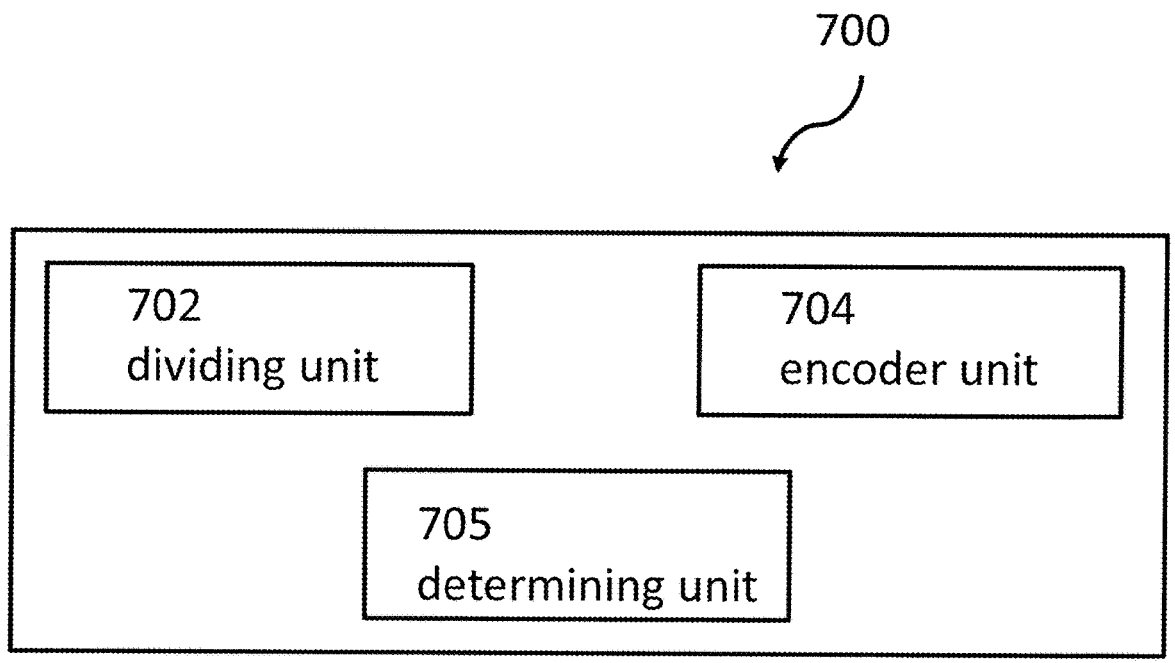
FIG. 7 shows a system for communicating supplemental data for a node of a system graph representing a system, in accordance with embodiments of the present invention.

FIG. 7 shows a system 700 for communicating supplemental data for a node of a system graph representing a system, in accordance with embodiments of the present invention. The system comprises a dividing unit 702 adapted for dividing a visual representation of the system graph into partial representations, each representation being associated with a node of the system, and an encoder unit 704 adapted for encoding steganographically the supplemental data together with offset data between a reference point of the node and a reference point of the associated partial representations of the node into the associated partial representation. The system comprises a determining unit 705 for determining a maximum number of bits per node for the supplemental data for the node based on the applied steganographical method for steganographical encoding and the number of pixels per rectangle.

Figure 8:
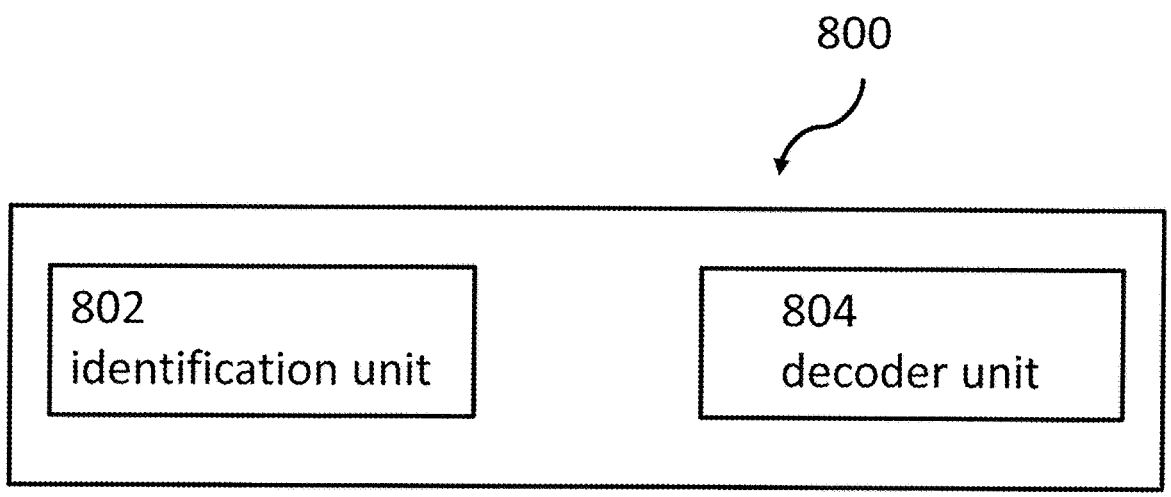
FIG. 8 shows a system for extracting communicated supplemental data for a node of a system graph representing a system, in accordance with embodiments of the present invention.

FIG. 8 shows a system 800 for extracting communicated supplemental data for a node of a system graph representing a system, in accordance with embodiments of the present invention. The system comprises an identification unit 802 adapted for identifying a predefined start pattern in the system graph representing the system for determining a rectangle comprising encoded supplemental data relating to a node in the system graph representation. The supplemental data are encoded steganographically. The system comprises as well a decoder unit 804 adapted for decoding the supplemental data and an offset between a reference point of the partial representation and a reference point of the related node.

Embodiments of the invention may be implemented together with virtually any type of computer, regardless of the platform being suitable for storing and/or executing program code.

Figure 9:
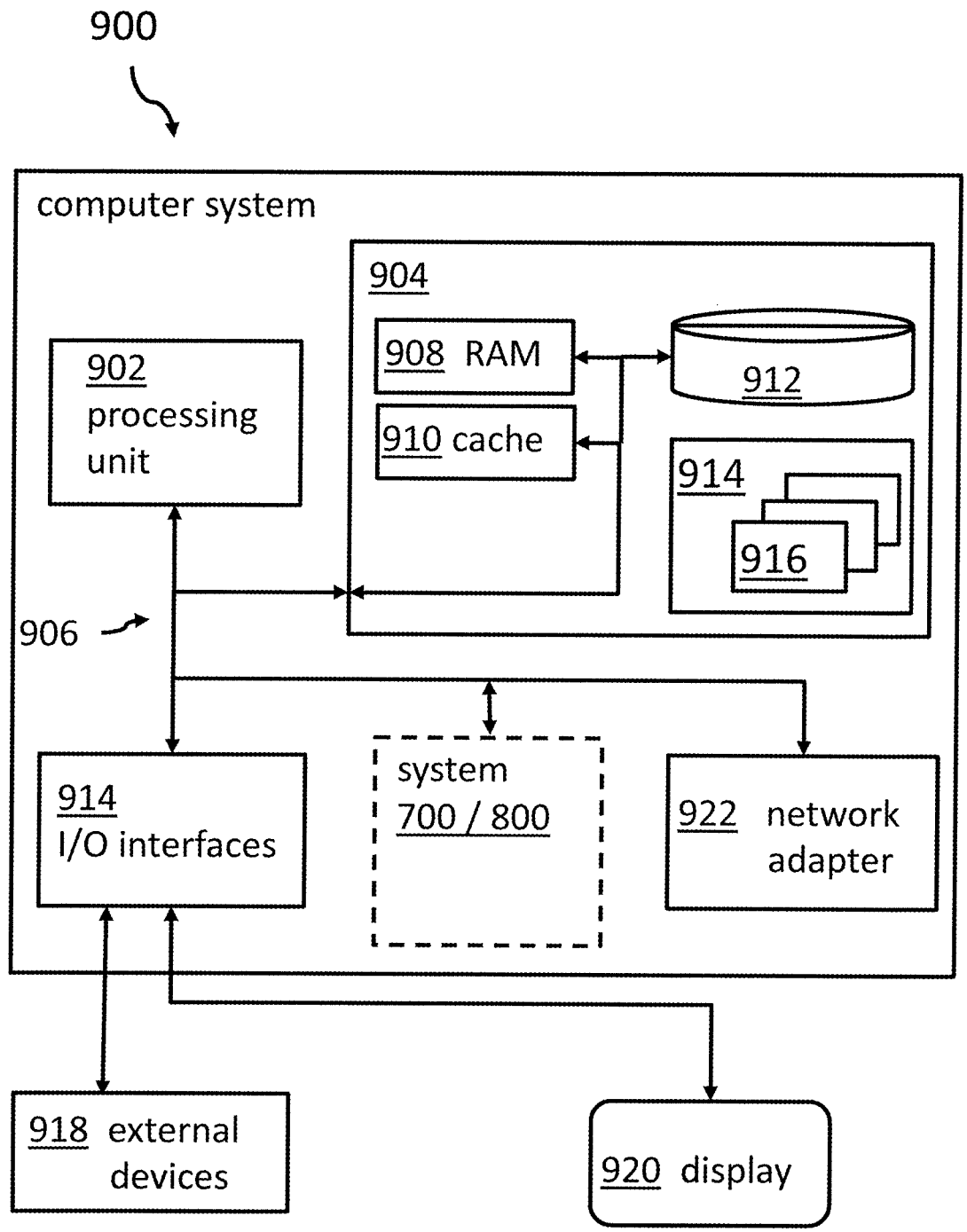
FIG. 9 shows a computer system for executing program code to implement methods of the present invention.

FIG. 9 shows a computer system 900 for executing program code to implement methods of the present invention.

The computer system 900 is only one example of a suitable computer system and is not intended to suggest any limitation as to the scope of use or functionality of embodiments of the invention described herein. Regardless, computer system 900 is capable of being implemented and/or performing any of the functionality set forth hereinabove. In the computer system 900, there are components, which are operational with numerous other general purpose or special purpose computer system environments or configurations. Examples of well-known computer systems, environments, and/or configurations that may be suitable for use with computer system/server 900 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 900 may be described in the general context of computer system-executable instructions, such as program modules, being executed by a computer system 900. Generally, program modules may include routines, programs, objects, components, logic, data structures, and so on that perform particular tasks or implement particular abstract data types. Computer system/server 900 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 900 is shown in the form of a general-purpose computing device. The components of computer system/server 900 may include, but are not limited to, one or more processors or processing units 902, a system memory 904, and a bus 906 that couples various system components including system memory 904 to the processor 902. Bus 906 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 900 typically includes a variety of computer system readable media. Such media may be any available media that is accessible by computer system/server 900, and it includes both, volatile and non-volatile media, removable and non-removable media.

The system memory 904 may include computer system readable media in the form of volatile memory, such as random access memory (RAM) 908 and/or cache memory 910. Computer system/server 900 may further include other removable/non-removable, volatile/non-volatile computer system storage media. By way of example only, storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 906 by one or more data media interfaces. As will be further depicted and described below, memory 904 may include at least one program product having a set (e.g., at least one) of program modules that are configured to carry out the functions of embodiments of the invention.

Program/utility 914, having a set (at least one) of program modules 916, may be stored in memory 904 (i.e., in storage device 912, cache 910, RAM 908, etc.) by way of example, and not limitation, as well as an operating system, one or more application programs, other program modules, and program data. Each of the operating system, one or more application programs, other program modules, and program data or some combination thereof, may include an implementation of a networking environment. Program modules 916 generally carry out the functions and/or methodologies of embodiments of the invention as described herein.

The computer system/server 900 may also communicate with one or more external devices 918 such as a keyboard, a pointing device, a display 920, etc.; one or more devices that enable a user to interact with computer system/server 900; and/or any devices (e.g., network card, modem, etc.) that enable computer system/server 900 to communicate with one or more other computing devices. Such communication can occur via Input/Output (I/O) interfaces 914. Still yet, computer system/server 900 may communicate with one or more networks such as a local area network (LAN), a general wide area network (WAN), and/or a public network (e.g., the Internet) via network adapter 922. As depicted, network adapter 922 may communicate with the other components of computer system/server 900 via bus 906. It should be understood that although not shown, other hardware and/or software components could be used in conjunction with computer system/server 900. Examples, include, but are not limited to: microcode, device drivers, redundant processing units, external disk drive arrays, RAID systems, tape drives, and data archival storage systems, etc.

Additionally, the system 700 of FIG. 7 for communicating supplemental data for a node for a system graph and/or the system 800 for extracting communicated supplemental data for a node of a system graph representing a system may be attached to the bus system 906.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for communicating supplemental data for nodes of a graph, said method comprising:

dividing, by one or more processors of a computer system, a visual representation of the graph into a plurality of rectangles on a computer screen, each rectangle corresponding to a respective node of the graph in a 1:1 relationship between the rectangles and the respective nodes, said dividing comprising contiguously distributing the rectangles both horizontally and vertically to form a rectangular array of the rectangles that encompass the respective nodes displayed on the computer screen; and encoding steganographically, by the one or more processors, supplemental data for each respective node, together with an offset distance between a reference point of each respective node and a reference point of the supplemental data for each respective node, into the rectangle corresponding to each respective node.

2. The method of claim 1, said method further comprising:
prioritizing, by the one or more processors, fixed length attributes related to the respective node, and
encoding steganographically, by the one or more processors, the attributes into the rectangle corresponding to the respective node, said encoding starting with a highest priority attribute of the fixed length attributes and continuing sequentially according to a priority of the remaining attributes of the fixed length attributes.

3. The method of claim 1, said method further comprising:
determining, by the one or more processors, a maximum number of bits per node for the supplemental data for each respective node based on an applied steganographical method for said steganographically encoding supplemental data and a number of pixels per rectangle.

4. The method of claim 1, said method further comprising;
selecting, by the one or more processors, the reference point of the supplemental data as a top left corner position of the rectangle corresponding to the respective node or a center position of the rectangle corresponding to the respective node.

5. The method of claim 1, said method further comprising:
integrating, by the one or more processors, a predefined start pattern at a beginning of each supplemental data of each rectangle.

6. The method of claim 1, said method further comprising:
selecting, by the one or more processors, positions of the portions of the graphical representation such that a product of all of the offset distances is reduced or minimized.

7. The method of claim 1, said method further comprising:
integrating, by the one or more processors, size information about the portions of the graphical representation steganographically into the supplemental data for the respective nodes.

8. The method of claim 1, said method further comprising:
identifying a predefined start pattern in the graph representing for determining a rectangle comprising the encoded supplemental data associated with each respective node; and
decoding the steganographically encoded supplemental data and the offset distance from the portion of the graphical representation corresponding to each respective node.

9. A computer system, comprising one or more processors, one or more memories, and one or more computer readable hardware storage devices, said one or more hardware storage device containing program code executable by the one or more processors via the one or more memories to implement a method for communicating supplemental data for nodes of a graph, said method comprising:
dividing, by the one or more processors, a visual representation of the graph into a plurality of rectangles on a computer screen, each rectangle corresponding to a respective node of the graph in a 1:1 relationship between the rectangles and the respective nodes, said dividing comprising contiguously distributing the rectangles both horizontally and vertically to form a rectangular array of the rectangles that encompass the respective nodes displayed on the computer screen; and
encoding steganographically, by the one or more processors, supplemental data for each respective node, together with an offset distance of finite length between a reference point of each respective node and a reference point of the supplemental data for each respective node, into the rectangle corresponding to each respective node.

10. The computer system of claim 9, said method further comprising:
prioritizing, by the one or more processors, fixed length attributes related to the respective node, and
encoding steganographically, by the one or more processors, the attributes into the rectangle corresponding to the respective node, said encoding starting with a highest priority attribute of the fixed length attributes and continuing sequentially according to a priority of the remaining attributes of the fixed length attributes.

11. The computer system of claim 9, said method further comprising:
determining, by the one or more processors, a maximum number of bits per node for the supplemental data for each respective node based on an applied steganographical method for said steganographically encoding supplemental data and a number of pixels per rectangle.

12. The computer system of claim 9, said method further comprising;
selecting, by the one or more processors, the reference point of the supplemental data as a top left corner position of the rectangle corresponding to the respective node or a center position of the rectangle corresponding to the respective node.

13. The computer system of claim 9, said method further comprising:
integrating, by the one or more processors, a predefined start pattern at a beginning of each supplemental data of each rectangle.

14. The computer system of claim 9, said method further comprising:
selecting, by the one or more processors, positions of the portions of the graphical representation such that a product of all of the offset distances is reduced or minimized.

15. A computer program product, comprising one or more computer readable hardware storage devices having computer readable program code stored therein, said program code containing instructions executable by one or more processors of a computer system to implement a method for communicating supplemental data for nodes of a graph, said method comprising:
dividing, by the one or more processors, a visual representation of the graph into a plurality of rectangles on a computer screen, each rectangle corresponding to a respective node of the graph in a 1:1 relationship between the rectangles and the respective nodes, said dividing comprising contiguously distributing the rectangles both horizontally and vertically to form a rectangular array of the rectangles that encompass the respective nodes displayed on the computer screen; and
encoding steganographically, by the one or more processors, supplemental data for each respective node, together with an offset distance of finite length between a reference point of each respective node and a reference point of the supplemental data for each respective node, into the rectangle corresponding to each respective node.

16. The computer program product of claim 15, said method further comprising:
prioritizing, by the one or more processors, fixed length attributes related to the respective node, and encoding steganographically, by the one or more processors, the attributes into the rectangle corresponding to the respective node, said encoding starting with a highest priority attribute of the fixed length attributes and continuing sequentially according to a priority of the remaining attributes of the fixed length attributes.

17. The computer program product of claim 15, said method further comprising:
    determining, by the one or more processors, a maximum number of bits per node for the supplemental data for each respective node based on an applied steganographical method for said steganographically encoding supplemental data and a number of pixels per rectangle.

18. The computer program product of claim 15, said method further comprising;
    selecting, by the one or more processors, the reference point of the supplemental data as a top left corner position of the rectangle corresponding to the respective node or a center position of the rectangle corresponding to the respective node.

19. The computer program product of claim 15, said method further comprising:
    integrating, by the one or more processors, a predefined start pattern at a beginning of each supplemental data of each rectangle.

20. The computer program product of claim 15, said method further comprising:
    selecting, by the one or more processors, positions of the portions of the graphical representation such that a product of all of the offset distances is reduced or minimized.

* * * * *